(12) United States Patent
Hatchett et al.

(10) Patent No.: US 7,262,939 B2
(45) Date of Patent: Aug. 28, 2007

(54) SYSTEM, METHOD, AND APPARATUS FOR ATTACHING TOP POLE PIECE OF A VOICE COIL MOTOR TO A HARD DISK DRIVE ENCLOSURE

(75) Inventors: Michael Robert Hatchett, San Jose, CA (US); Daniel Robert Stacer, Morgan Hill, CA (US)

(73) Assignee: Hitachi Global Storage Technologies Netherlands, BV, Amsterdam (NL)

( * ) Notice: Subject to any disclaimer, the term of this patent is extended or adjusted under 35 U.S.C. 154(b) by 368 days.

(21) Appl. No.: 10/903,203

(22) Filed: Jul. 30, 2004

(65) Prior Publication Data

US 2006/0023347 A1 Feb. 2, 2006

(51) Int. Cl.
*G11B 33/14* (2006.01)
*G11B 5/55* (2006.01)

(52) U.S. Cl. ............................ 360/264.8; 360/264.3; 360/264.7; 360/264.9; 360/265

(58) Field of Classification Search ............ 360/264.8, 360/264.7, 265, 264.9, 264.1, 264.3, 264, 360/260, 266.4, 266.7, 266.8, 97.01
See application file for complete search history.

(56) References Cited

U.S. PATENT DOCUMENTS

| | | | | |
|---|---|---|---|---|
| 5,315,466 A | * | 5/1994 | Nishimoto et al. ...... | 360/264.8 |
| 5,636,091 A | * | 6/1997 | Asano ..................... | 360/264.3 |
| 6,175,469 B1 | * | 1/2001 | Ahmad et al. ........... | 360/97.02 |
| 6,347,023 B1 | * | 2/2002 | Suwa ...................... | 360/264.8 |
| 6,445,549 B1 | * | 9/2002 | Okunaga et al. ......... | 360/264.8 |
| 6,603,633 B2 | * | 8/2003 | Heaton et al. ........... | 360/97.02 |
| 6,952,323 B2 | * | 10/2005 | Hirasaka et al. ......... | 360/97.01 |
| 2003/0081357 A1 | * | 5/2003 | Hong et al. .............. | 360/266.3 |
| 2003/0165032 A1 | * | 9/2003 | Miyamoto et al. ....... | 360/264.1 |

* cited by examiner

*Primary Examiner*—Wayne Young
*Assistant Examiner*—Matthew G. Kayrish
(74) *Attorney, Agent, or Firm*—Bracewell & Giuliani LLP

(57) ABSTRACT

A top pole piece of a voice coil motor (VCM) is attached to a hard disk drive cover without screw fasteners and with minimal loss of VCM magnetic flux capacity. A pair of leaf springs are supported at both ends, rather than by cantilever, to more uniformly distribute mechanical stress throughout the springs so that less space is required to achieve the same transverse load as a cantilevered spring of the same profile. The smaller space envelope required by this design minimizes the loss of magnetic flux capacity of the VCM. Each leaf spring has two integral legs, central portions of which are rigidly fastened to the drive cover. The end of each leg opposite the central portion applies a force against the cover in the assembled disk drive.

16 Claims, 4 Drawing Sheets

SYSTEM, METHOD, AND APPARATUS FOR ATTACHING TOP POLE PIECE OF A VOICE COIL MOTOR TO A HARD DISK DRIVE ENCLOSURE

BACKGROUND OF THE INVENTION

1. Technical Field

The present invention relates in general to an improved hard disk drive and, in particular, to an improved system, method, and apparatus for attaching the top pole piece of a voice coil motor to the cover of a hard disk drive enclosure.

2. Description of the Related Art

Data access and storage systems generally comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to five disks are stacked vertically on a common spindle that is turned by a disk drive motor at several thousand revolutions per minute (rpm). Hard disk drives have several different typical standard sizes or formats, including server, desktop, mobile (2.5 and 1.8 inches) and microdrive.

A typical HDD also uses an actuator assembly to move magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

A slider is typically formed with an aerodynamic pattern of protrusions on its air bearing surface (ABS) that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

In the hard disk drive enclosure, a common means for joining a top pole piece of the actuator VCM to the drive cover is fasteners such as screws. Due to tolerance conditions, there can be a gap between the cover and the top pole piece. Under these conditions, the force applied by the screws distorts the drive cover, which adversely affects the nominal attitude of the actuator mechanism. Likewise, interference between the cover and top pole also distorts the cover.

An alternative to screw fasteners is the use of one or more leaf spring(s) 211 (FIGS. 1 and 2) located between the cover 213 and the top pole piece 215 of the VCM 217. Generally, the leaf spring 211 is a funnel-like design having an open, L-shaped perimeter 212 or upper edge and a thin, zig-zag shaped, lower edge opening 214. Only the upper edge or perimeter 212 contacts and is rigidly attached (e.g., via adhesive) to the cover 213 with a cantilevered boundary condition. The funnel like body of spring 211 protrudes downward from cover 213. The opposite end or lower edge opening 214 of the leaf spring 211 does not contact the cover 213, but instead contacts the upper surface of top pole 215 of the VCM 217. The spring 211 thereby applies a force against the top pole 215 of the VCM 217.

This prior art leaf spring 211 provides structural stiffness in the plane of the cover 213 while remaining compliant in a direction that is transverse to the plane of the cover. This design results in reduced cover distortion for the same tolerance conditions described above. As depicted in FIGS. 1 and 2, a significant drawback of this design is that the space required for the spring 211 reduces the volume available for the top pole piece 215. This design also causes a reduction in both magnetic flux capacity and corresponding torque constant of the VCM 217 as it completely overlaps the magnetic transition 218 of magnet 217. Thus, an improved design for interfacing the VCM top pole piece and the cover of the disk drive enclosure would be desirable.

SUMMARY OF THE INVENTION

One embodiment of a system, method, and apparatus for attaching the top pole piece of a VCM to a hard disk drive cover without screw fasteners and with minimal loss of VCM magnetic flux capacity is disclosed. The present invention is achieved with a component comprising two leaf springs that are supported at both ends rather than a cantilevered support. As a result, for the same applied force and space envelope as a cantilevered spring, mechanical stress is more uniformly distributed throughout the spring member so that less space is required to achieve the same transverse load as a cantilevered spring. The smaller space envelope required by this design minimizes the loss of magnetic flux capacity of the VCM.

In the present invention, the leaf spring connector consists of two integral legs. The central portion of the leaf spring connector is rigidly fastened to the drive cover. The end of each leg opposite the central portion is not rigidly fastened to the cover, but applies a force against the cover in the assembled condition of the disk drive. The boundary conditions at the ends of each leg are as follows: one end of each leg has a "fixed" condition while the opposite end is "simply supported." Both ends of each leg apply loads against the cover, while a reaction force is applied to the VCM top pole piece at the center of each leg. The reaction force provides sufficient friction required to prevent in-plane slip between the leg and the top pole piece during operation of the disk drive. The top pole piece of the VCM has a recessed zone under the profile of the spring legs. This recessed zone is located away from the magnetic transition of the VCM magnet to minimize the loss of magnetic flux capacity.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
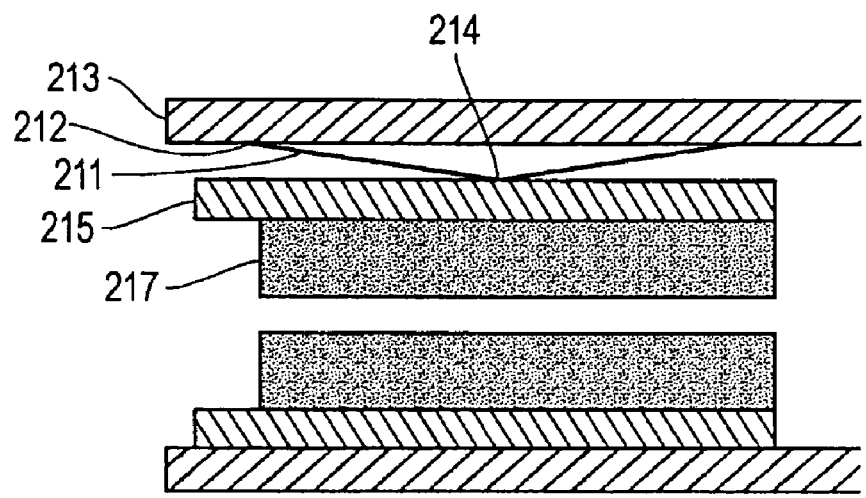
FIG. 1 is a sectional side view of a conventional voice coil motor (VCM) and cantilever spring assembly.
Figure 2:
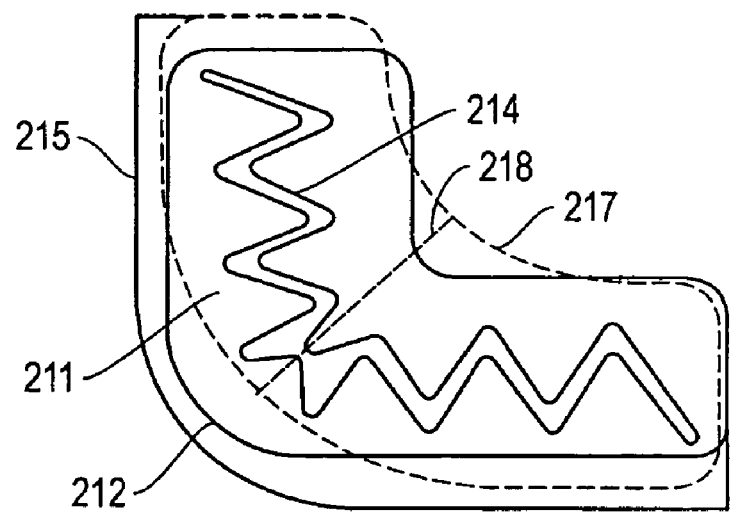
FIG. 2 is a top plan view of a top pole piece and the cantilever spring of the VCM of FIG. 1.
Figure 3:
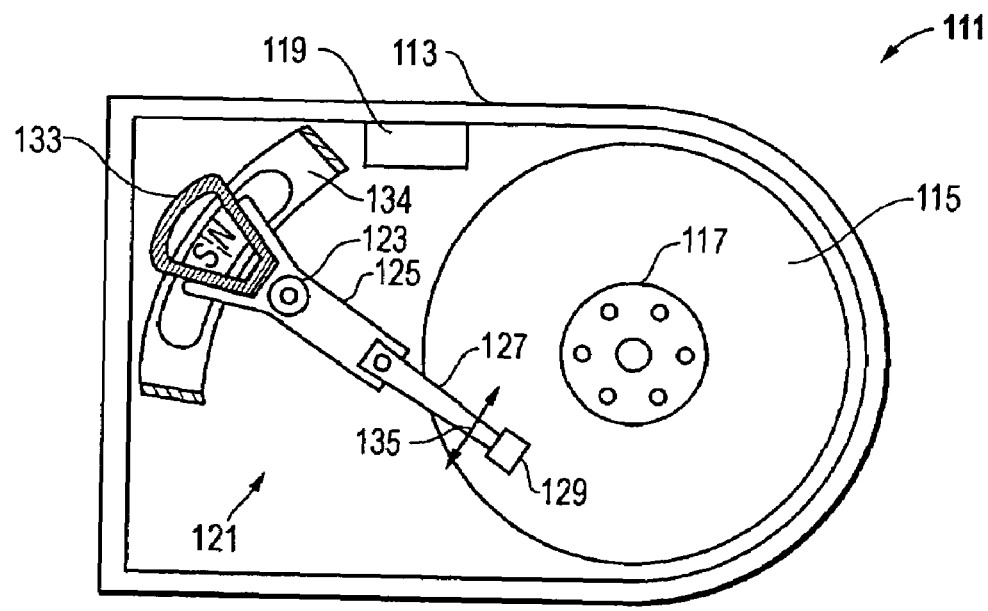
FIG. 3 is a schematic plan view of a disk drive constructed in accordance with the present invention.

Referring to FIG. 3, a schematic drawing of one embodiment of an information storage system comprising a magnetic hard disk file or drive 111 for a computer system is shown. Drive 111 has an outer housing or base 113 containing at least one magnetic disk 115. Disk 115 is rotated by a spindle motor assembly having a central drive hub 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127. The head is typically "pico" size (approximately 1250×1000×300 microns) and formed from ceramic or intermetallic materials. The head also may be "femto" size (approximately 850×700×230 microns) and is pre-loaded against the surface of disk 115 (in the range two to ten grams) by suspension 127.

Suspensions 127 have a spring-like quality which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Figure 4:
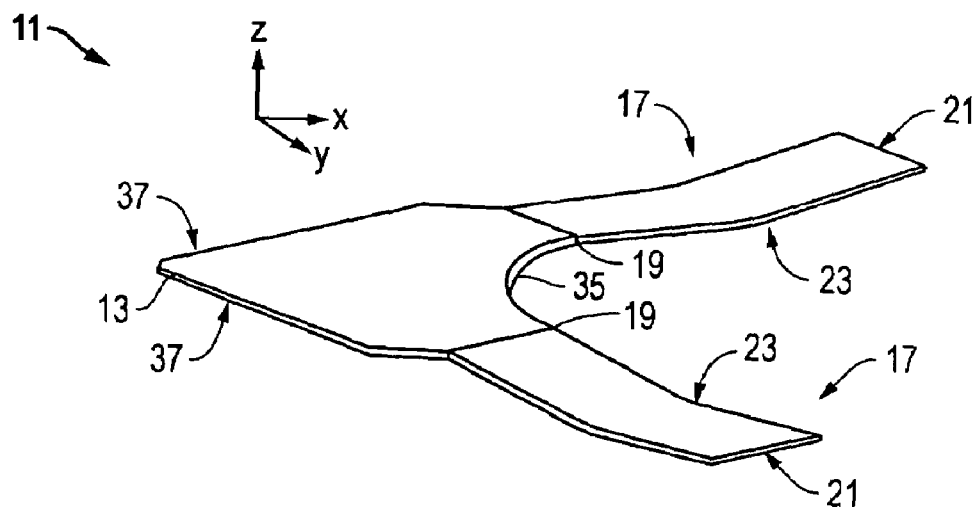
FIG. 4 is an isometric view of a leaf spring connector for a VCM utilized by the disk drive of FIG. 3.
Figure 5:
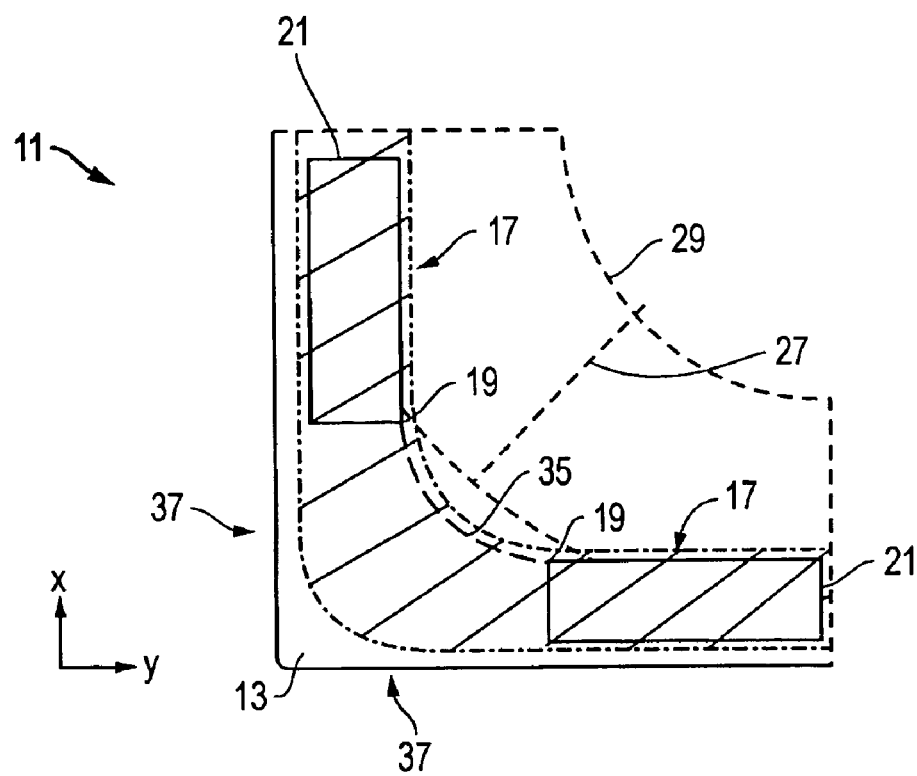
FIG. 5 is a top plan view of a top pole piece and the leaf spring connector of FIG. 4.
Figure 6:
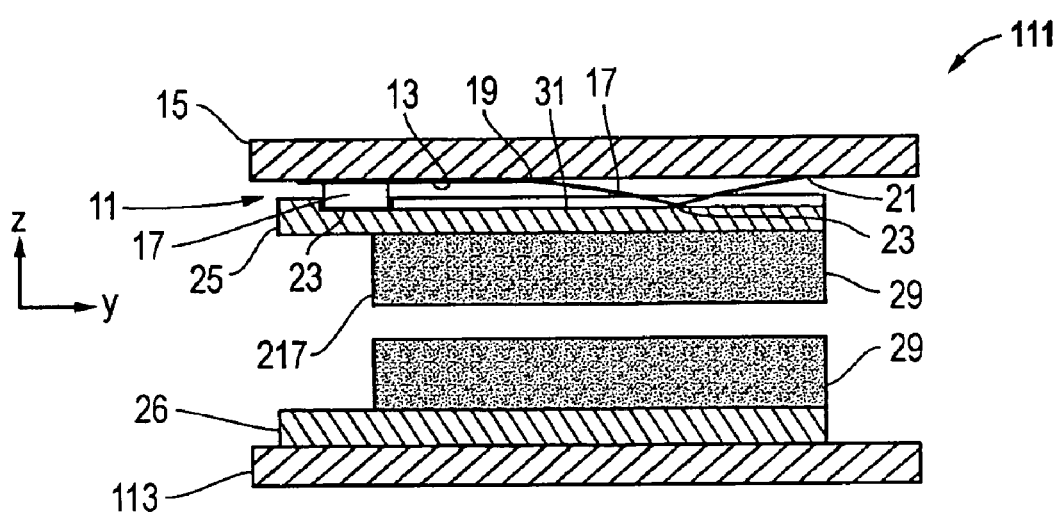
FIG. 6 is a sectional side view of the disk drive of FIG. 3 and the leaf spring connector of FIG. 4.

Referring now to FIGS. 4-6, one embodiment of an apparatus or spring assembly 11 for force loading a VCM pole piece in a disk drive is shown. In FIG. 6, the spring assembly 11 is shown in operation inside drive 111. The spring assembly 11 has a base 13 with an outer surface that is mounted (e.g., bonded) to an inner surface of the removable cover 15 of the hard disk drive enclosure 113.

A pair of legs 17 extend away from the base 13, such that a proximal end 19 of each leg 17 is rigidly secured to the base 13, and a distal or opposite end 21 of each leg 17 is free to load against the cover 15. Frictional force between distal ends 21 and cover 15 prevent excess movement therebetween. In a plan view (FIG. 5), the spring assembly 11 is generally L-shaped, the base has a flat planar shape (FIG. 4) and is located at an apex of the spring assembly 11. The legs 17 extend orthogonally from the base 13 at a 90° angle relative to each other.

For convenient reference, a Cartesian coordinate system is provided. The legs generally extend in the x and y-directions, and provide force in a z-direction. Each leg 17 has a contact portion 23 that is designed to contact with the top pole piece 25 of the voice coil motor 133 for maintaining an orientation of the top pole piece 25. The voice coil motor 133 is mounted to the enclosure 113 for moving the actuator 121. The voice coil motor 133 has both top and bottom pole pieces 25, 26, and a magnet 29. Each pole piece has north and south polarity portions separated by a magnetic transition 27. In one embodiment, each of the legs 17 has a shallow, general V-shape (see FIGS. 4 and 6) with a respective one of the contact portions 23 being located at an apex thereof.

The spring assembly 11 is designed to be spaced apart from the magnetic transition 27 of the magnet 29 of the voice coil motor 133 in both the x and y-directions such that there is no reduction in a flux density of the voice coil motor 133 due to the presence of the spring assembly 11. In one embodiment, the top pole piece 25 has a recessed area 31 on an exterior surface thereof located opposite the magnet 29. The spring assembly 11 is seated in the recessed area(s) 31, as shown at contact portions 23. However, as shown in FIGS. 5 and 6, the recessed areas 31 are spaced away from the magnetic transition of the VCM magnet in the y-direction to minimize the loss of magnetic flux capacity.

The geometry of the illustrated embodiment includes a radius of curvature 35 on an inner portion of base 13 that smoothly transitions into one side of each of the legs 17 at proximal ends 19. The base 13 also has a rectangular profile 37 on an outer portion thereof opposite the radius of curvature 35. As shown in FIG. 5, base 13 has a wider profile than legs 17 as measured in the x and y-directions at rectangular profile 37. However, the respective x and y-lengths of legs 17 are approximately equal to those dimensions of base 13. In addition, the base defines a plane, below which legs 17 extend at proximal ends 19 before returning upward toward the plane from contact portions 23 to distal ends 21.

Figure 7:
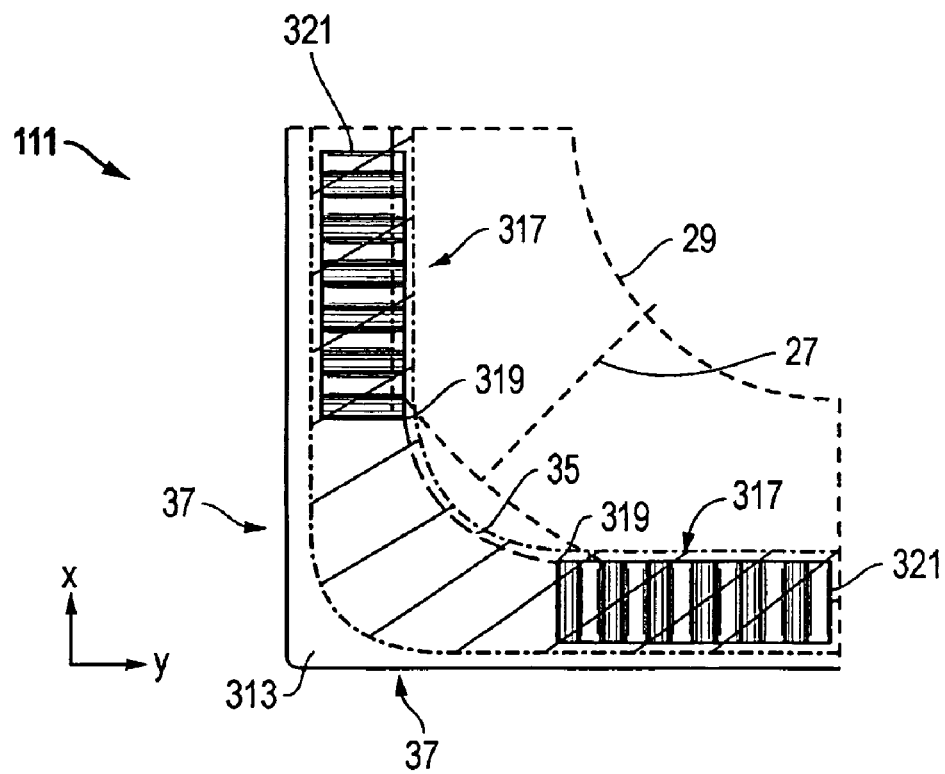
FIG. 7 is a top plan view of an alternate embodiment of a leaf spring connector installed in the disk drive of FIG. 3.
Figure 8:
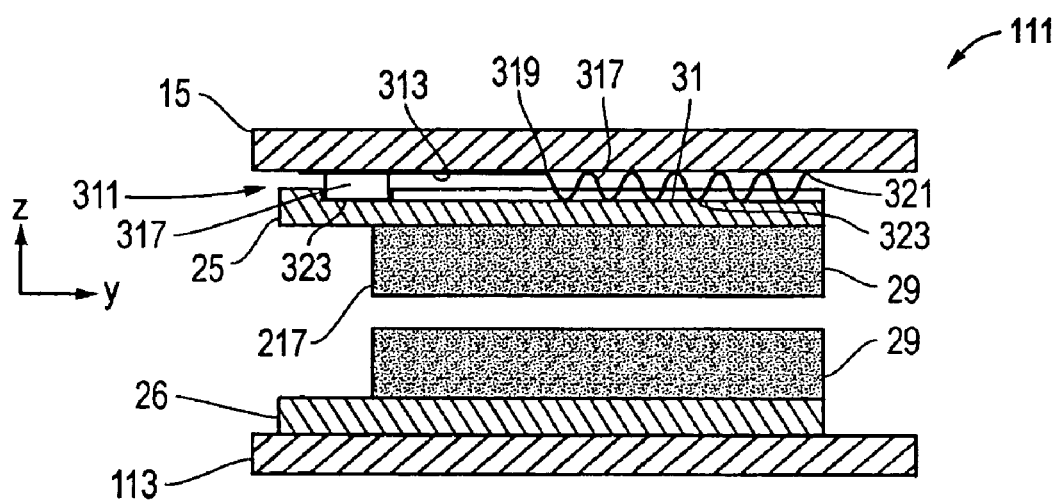
FIG. 8 is a sectional side view of the disk drive and the leaf spring connector of FIG. 7.

Referring now to FIGS. 7 and 8, an alternate embodiment of a spring assembly 311 constructed in accordance with the present invention is shown. Spring assembly 311 is similar to the previous embodiment, except that its legs 317 are formed in a wave-like or corrugated profile as shown. The corrugations of legs 317 maintain separation between cover 15 and top pole piece 25. This design has the added advantage of providing multiple locations for restraining the top pole piece 25 via the plurality of "ribs" formed by the corrugations, and thereby improves the performance of the part. Spring assembly 311 shares the same advantages as the previous embodiment, and also includes a base 313, proximal ends 319, distal ends 321, and top pole piece contact portions 323.

The present invention has several advantages, including the ability to attach the top pole piece of a VCM to a hard disk drive cover without screw fasteners and with minimal loss of magnetic flux capacity is disclosed. Mechanical stress is more uniformly distributed throughout the spring member so that less space is required to achieve the same transverse load as a cantilevered spring of the same space requirement. The smaller space envelope also minimizes the loss of magnetic flux capacity of the VCM. The ends of each leg apply loads against the cover, while a reaction force is applied to the top pole piece at the center of each leg. The reaction force provides sufficient friction required to prevent in-plane slip between the leg and the top pole piece during operation of the disk drive. The recessed zone of the top pole piece is located away from the magnetic transition of the VCM magnet to minimize the loss of magnetic flux capacity.

While the invention has been shown or described in only some of its forms, it should be apparent to those skilled in the art that it is not so limited, but is susceptible to various changes without departing from the scope of the invention.

What is claimed is:

1. A hard disk drive, comprising:
   an enclosure having a cover that is removable;
   a media disk rotatably mounted to the enclosure;
   an actuator mounted to the enclosure for moving a transducer relative to the media disk for reading data from and writing data to the media disk;
   a voice coil motor mounted to the enclosure for moving the actuator, the voice coil motor having pole pieces and a magnet with a magnetic transition located between north and south pole portions of each pole piece;
   a spring assembly having a base mounted to the cover and a plurality of legs extending away from the base, such that one end of each leg is rigidly secured to the base, and an opposite end of each leg is free to load against the cover, and each leg having a contact portion spaced apart from the opposite end and in contact with one of the pole pieces for maintaining an orientation of said one of the pole pieces; wherein
   the spring assembly is spaced apart from the magnetic transition such that the spring assembly does not physically overlap the magnetic transition and there is no reduction in a flux density of the voice coil motor due to the presence of the spring assembly; and wherein
   one of the pole pieces has a recessed area on an exterior surface thereof located opposite the magnet, and only the legs of the spring assembly are seated in the recessed area.

2. The hard disk drive of claim 1, wherein each of the legs is generally V-shaped with a respective one of the contact portions being located at an apex between said one end and said opposite end of each leg.

3. The hard disk drive of claim 1, wherein each of the legs has a generally corrugated profile that contacts both the cover and said one of the pole pieces in a plurality of locations on each of the cover and said one of the pole pieces.

4. The hard disk drive of claim 1, wherein the spring assembly is generally L-shaped, the base has a flat planar shape and is located at an apex of the spring assembly, and the plurality of legs comprises a pair of legs that extend orthogonally from the base at a 90° angle relative to each other.

5. The hard disk drive of claim 4, wherein the base has a radius of curvature on an inner portion thereof that smoothly transitions into one side of each of the legs, and the base having a rectangular profile on an outer portion thereof opposite the inner portion.

6. A hard disk drive, comprising:
   an enclosure having a cover that is removable and x, y, and z directions;
   a media disk rotatably mounted to the enclosure, the media disk having an axis extending in the z-direction;
   an actuator mounted to the enclosure for moving a transducer relative to the media disk for reading data from and writing data to the media disk;
   a voice coil motor mounted to the enclosure for moving the actuator, the voice coil motor having top and bottom pole pieces and a magnet with a magnetic transition located between north and south pole portions of each pole piece, and the top pole piece has a recessed area on an exterior surface thereof located opposite the magnet;
   a spring assembly having a base mounted to the cover and a pair of legs extending away from the base in the x and y-directions, such that one proximal end of each leg is rigidly secured to the base, and an opposite distal end of each leg is free to load against the cover in the z-direction, and each leg having a contact portion between respective proximal and opposite distal ends in contact with the top pole piece for maintaining an orientation of the top pole piece; and
   the pair of legs of the spring assembly being at least partially seated in the recessed area of the top pole piece.

7. The hard disk drive of claim 6, wherein the spring assembly is spaced apart from the magnetic transition in the x and y-directions such that the spring assembly does not overlap the magnetic transition in an x-y-plane and there is no reduction in a flux density of the voice coil motor due to the presence of the spring assembly.

8. The hard disk drive of claim 6, wherein each of the legs is generally V-shaped with a respective one of the contact portions being located at an apex between the proximal and opposite distal ends.

9. The hard disk drive of claim 6, wherein the spring assembly is generally L-shaped, the base has a flat planar shape and is located at an apex of the spring assembly, and the legs extend orthogonally from the base at a 90° angle relative to each other.

10. The hard disk drive of claim 6, wherein the base has a radius of curvature on an inner portion thereof that smoothly transitions into one side of each of the legs, and the base having a rectangular profile on an outer portion thereof opposite the inner portion.

11. The hard disk drive of claim 6, wherein each of the legs has a generally corrugated profile that contacts both the cover and the top pole piece at a plurality of locations.

12. A hard disk drive, comprising:
an enclosure having a cover that is removable and x, y, and z directions;
a media disk rotatably mounted to the enclosure, the media disk having an axis extending in the z-direction;
an actuator mounted to the enclosure for moving a transducer relative to the media disk for reading data from and writing data to the media disk;
a voice coil motor mounted to the enclosure for moving the actuator, the voice coil motor having top and bottom pole pieces and a magnet with a magnetic transition located between north and south pole portions of each pole piece, and the top pole piece has a recessed area on an exterior surface thereof located opposite the magnet;
a spring assembly having a base mounted to the cover and a pair of legs extending away from the base in the x and y-directions, such that one proximal end of each leg is rigidly secured to the base, and an opposite distal end of each leg is free to load against the cover in the z-direction, and each leg having a contact portion between respective proximal and opposite distal ends in contact with the top pole piece for maintaining an orientation of the top pole piece;
the base and pair of legs of the spring assembly being at least partially seated in the recessed area of the top pole piece; and
the spring assembly is spaced apart from the magnetic transition in the x and y-directions such that the spring assembly does not overlap the magnetic transition in an x-y-plane and there is no reduction in a flux density of the voice coil motor due to the presence of the spring assembly.

13. The hard disk drive of claim 12, wherein each of the legs is generally V-shaped with respective ones of the contact portions being located at apexes of the V-shaped legs.

14. The hard disk drive of claim 12, wherein the spring assembly is generally L-shaped, the base has a flat planar shape and is located at an apex of the spring assembly, and the pair of legs extends orthogonally from the base at a 90° angle relative to each other.

15. The hard disk drive of claim 12, wherein the base has a radius of curvature on an inner portion thereof that smoothly transitions into one side of each of the legs, and the base having a two-sided rectangular profile on an outer portion thereof opposite the inner portion.

16. The hard disk drive of claim 12, wherein each of the legs has a generally corrugated profile that contacts both the cover and the top pole piece at a plurality of locations.

* * * * *